United States Patent
Yu et al.

(10) Patent No.: US 10,999,574 B2
(45) Date of Patent: May 4, 2021

(54) SIMPLIFIED PROCESSING OF WEIGHTED PREDICTION SYNTAX AND SEMANTICS USING A BIT DEPTH VARIABLE FOR HIGH PRECISION DATA

(71) Applicant: ARRIS Enterprises, Inc., Suwanee, GA (US)

(72) Inventors: Yue Yu, San Diego, CA (US); Limin Wang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 48 days.

(21) Appl. No.: 14/533,347

(22) Filed: Nov. 5, 2014

(65) Prior Publication Data

US 2015/0131721 A1 May 14, 2015

Related U.S. Application Data

(60) Provisional application No. 61/900,337, filed on Nov. 5, 2013.

(51) Int. Cl.
*H04N 19/105* (2014.01)
*H04N 19/577* (2014.01)
(Continued)

(52) U.S. Cl.
CPC ......... *H04N 19/105* (2014.11); *H04N 19/139* (2014.11); *H04N 19/184* (2014.11);
(Continued)

(58) Field of Classification Search
CPC .. H04N 19/105; H04N 19/139; H04N 19/184; H04N 19/573; H04N 19/577; H04N 19/70; H04N 19/50; H04N 16/105
See application file for complete search history.

(56) References Cited

U.S. PATENT DOCUMENTS

| | | | |
|---|---|---|---|
| 2015/0095503 A1* | 4/2015 | Lim | H04L 67/02 709/227 |
| 2015/0098503 A1* | 4/2015 | Pu | H04N 19/105 375/240.12 |
| 2015/0124882 A1 | 5/2015 | Yu et al. | |

OTHER PUBLICATIONS

Pu et al. ("High Precision Weighted Prediction for HEVC Range Extension" Document: JCTVC-O0235rl. Joint Collaborative Team on Video Coding (JCT-VC) of ITU-T SG 16 WP 3 and ISO/IEC JTC 1/SC 29/WG 11—15th Meeting: Geneva, CH, Oct. 23-Nov. 1, 2013, hereinafter "Pu2").*

(Continued)

*Primary Examiner* — Maria E Vazquez Colon
(74) *Attorney, Agent, or Firm* — Chernoff, Vilhauer, McClung & Stenzel, LLP

(57) ABSTRACT

Particular embodiments may remove a condition check in the semantics for checking a high-precision data flag. This simplifies the semantics used in the encoding and decoding process. In this case, even if the high-precision data flag is not set, the value of the weighted prediction syntax element is set by the BitDepth variable. However, even if the BitDepth is not considered high-precision data, such as 8 bits, the range for the weighted prediction syntax element is still the same as the fixed value. For example, the syntax elements luma_offset_l0[i], luma_offset_l1[i], delta_chroma_offset_l0[i][j], and delta_chroma_offset_l1[i][j] use the variable BitDepth as described above whether the flag extended_precision_processing_flag is enabled and not enabled to indicate whether the bit depth is above a threshold.

9 Claims, 4 Drawing Sheets

(51) Int. Cl.
   *H04N 19/573* (2014.01)
   *H04N 19/70* (2014.01)
   *H04N 19/139* (2014.01)
   *H04N 19/184* (2014.01)

(52) U.S. Cl.
   CPC ......... *H04N 19/573* (2014.11); *H04N 19/577* (2014.11); *H04N 19/70* (2014.11)

(56) References Cited

OTHER PUBLICATIONS

Pu et al. ("High Precision Weighted Prediction for HEVC Range Extension" Document: JCTVC-O0235rl. Joint Collaborative Team on Video Coding (JCT-VC) of ITU-T SG 16 WP 3 and ISO/IEC JTC 1/SC 29/WG 11—15th Meeting: Geneva, CH, Oct. 23-Nov. 1, 2013).*

Of Pu et al. ("High Precision Weighted Prediction for HEVC Range Extension" Document: JCTVC-O0235rl. Joint Collaborative Team on Video Coding (JCT-VC) of ITU-T SG 16 WP 3 and ISO/IEC JTC 1/SC 29/WG 11—15th Meeting: Geneva, CH, Oct. 23-Nov. 1, 2013) (Year: 2013).*

Pu et al. ("High Precision Weighted Prediction for HEVC Range Extension" Document: JCTVC-O0235rl. Joint Collaborative Team on Video Coding (JCT-VC) of ITU-T SG 16 WP 3 and ISO/IEC JTC 1/SC 29/WG 11—15th Meeting: Geneva, CH, Oct. 23-Nov. 1, 2013) (Year: 2013).*

Pu et al. ("High Precision Weighted Prediction for HEVC Range Extension" Document: JCTVC-O0235rl. Joint Collaborative Team on Video Coding (JCT-VC) of ITU-T SG 16 WP 3 and ISO/IEC JTC 1/SG 29/WG 11-15th Meeting: Geneva, CH, Oct. 23-Nov. 1, 2013) (Year: 2013).*

PCT Search Report & Written Opinion, RE: Application No. PCT/US2014/064073; dated Jan. 30, 2015.

A. Tanizawa, et al., "Proposed modifications of explicit weighted prediction", 9th JCT-VC Meeting, 100th MPEG Meeting (Joint Collaborative Team on Video Coding of ISO/IEC JTC1/SC29/WG11 and ITU-T SG.16) Apr. 17, 2012.

Benjamin Bross et al., High Efficiency video Coding (HEVC), text specification, Draft 10 (for FDIS & Last Call), Documetn: JCTVC-L1003_v34. Joint Collaborative Team on Video Coding (JCT-VC) of ITU-T SG 16 WP 3 and ISO/ IEC JTC 1/SC 29/WG 11-12th Meeting: Geneva, CH, Jan. 14-23, 2013. Entire document.

David Flynn et al., High Efficienty Video Coding (HEVC) Range Extensions text specification: Draft 4. Document: JCTVC-N1005_v1. Joint Collaborative Team on Video Coding (JCT-VC) of ITU-T SG 16 WP 3 and ISO/IEC JTC 1/SC 29/WG 11—13th Meeting: Incheon, KR, Apr. 18-26, 2013. Entire document.

Wei Pu et al., High Precision Weighted Prediction of HEVC Range Extension. Document: JCTVC-O0235rl. Joint Collaborative Team on Video Coding (JCT-VC) of ITU-T SG 16 WP 3 and ISO/IEC JTC 1/SC 29WG 11—15th Meeting: Geneva, CH, Oct. 23-Nov. 1, 2013. Entire document.

Examination Report, RE: European Application No. 14809545.8, dated May 11, 2017.

* cited by examiner

| | |
|---|---|
| pred_weight_table() { | DESCRIPTOR |
|   luma_log2_weight_denom | ue(v) |
|   if(ChromaArrayType !=0) | |
|     delta_chroma_log2_weight_denom | se(v) |
|   for(i=0;i <= num_ref_idx_l0_active_minus1;i++) | |
|     luma_weight_l0_flag[i] | u(l) |
|   if(ChromaArrayType !=0) | |
|     for(i=0;i <= num_ref_idx_l0_active_minus1;i++) | |
|       chroma_weight_l0_flag[i] | u(l) |
|   for(i=0;i <= num_ref_idx_l0_active_minus1;i++) { | |
|     if(luma_weight_l0_flag[i]) { | |
|       delta_luma_weight_l0[i] | se(v) |
|       luma_offset_l0[i] | se(v) |
|     } | |
|     if(chroma_weight_l0_flag[i]) | |
|       for(j=0;j<2;j++) { | |
|         delta_chroma_weight_l0[i][j] | se(v) |
|         delta_chroma_offset_l0[i][j] | se(v) |
|       } | |
|   } | |
|   if(slice_type == B) { | |
|     for(i=0;i <= num_ref_idx_l1_active_minus1;i++) | |
|       luma_weight_l1_flag[i] | u(l) |
|     if(ChromaArrayType != 0) | |
|       for(i=0;i <= num_ref_idx_l1_active_minus1;i++) | |
|         chroma_weight_l1_flag[i] | u(l) |
|     for(i=0;i <= num_ref_idx_l1_active_minus1;i++) { | |
|       if(luma_weight_l1_flag[i]) { | |
|         delta_luma_weight_l1[i] | se(v) |
|         luma_offset_l1[i] | se(v) |
|       } | |
|       if(chroma_weight_l1_flag[i]) | |
|         for(j=0;j<2;j++) { | |
|           delta_chroma_weight_l1[i][j] | se(v) |
|           delta_chroma_offset_l1[i][j] | se(v) |
|         } | |
|       } | |
|     } | |
|   } | |
| } | |

*FIG. 3*

SIMPLIFIED PROCESSING OF WEIGHTED PREDICTION SYNTAX AND SEMANTICS USING A BIT DEPTH VARIABLE FOR HIGH PRECISION DATA

CROSS-REFERENCES TO RELATED APPLICATIONS

The present disclosure claims priority to U.S. Provisional App. No. 61/900,337, entitled "Simplification of Weighted Prediction Syntax and Semantics for HEVC Range Extension", filed Nov. 5, 2013, the contents of which is incorporated herein by reference in its entirety.

BACKGROUND

The High Efficiency Video Coding ("HEVC") coding standard (also called H.265) is a coding standard promulgated by the ISO/IEC MPEG standardization organizations. HEVC supports resolutions higher than "high definition," which means pixels may be represented by a larger number of bits than the high definition pictures. For example, 4K resolutions may include images that are 4,000 pixels wide compared to high definition images that are 1920 pixels wide.

Temporal motion prediction is an effective method to increase the coding efficiency and provides high compression. HEVC uses a translational model for temporal motion prediction. According to the translational model, a prediction signal for a given current unit in a current picture is generated from a corresponding reference unit in a reference picture. The coordinates of the reference unit are given by a motion vector that describes the translational motion along horizontal (x) and vertical (y) directions that would be added/subtracted to/from the coordinates of the current unit. A decoder needs the motion vector to decode the compressed video.

HEVC may use single prediction using one reference pictures or bi-prediction using two reference pictures. The pixels in reference units of the reference pictures are used as the prediction. In some conditions, such as when fading occurs, pixels of one of the reference units in bi-prediction may not yield the most accurate prediction. To compensate for this, HEVC may use weighted prediction when performing the motion estimation process. Weighted prediction may weight the pixels in one or both of the reference units used as the prediction differently.

SUMMARY

Embodiments of the present invention remove a condition check in the semantics for checking a high-precision data flag. This simplifies the semantics used in the encoding and decoding process. Even if the high-precision data flag is not set, the value of the weighted prediction syntax element is set by the BitDepth variable. However, even if the BitDepth is not considered high-precision data, such as 8 bits, the range for the weighted prediction syntax element is still the same as the fixed value. For example, the syntax elements luma_offset_l0[i], luma_offset_l1[i], delta_chroma_offset_l0[i][j], and delta_chroma_offset_l1[i][j] use the variable BitDepth as described above whether the flag extended_precision_processing_flag is enabled and not enabled to indicate whether the bit depth is above a threshold.

More particularly, a method of the present invention includes the following steps: (1) setting a first value for a variable associated with a bit depth based on a number of bits associated with pixels of a reference picture; (2) determining a weighting factor for performing weighted prediction for a current unit of a current picture; (3) using the weighting factor to weight pixels of a first reference unit of a first reference picture when performing motion compensation for the current unit; and (4) setting a second value for a weighted prediction syntax element associated with the weighting factor whether an extended precision flag is enabled and not enabled to indicate whether the bit depth is above a threshold, wherein the second value for the weighted prediction syntax element is within a range set by the first value and is an offset for a prediction value used in performing motion compensation.

BRIEF DESCRIPTION OF THE DRAWINGS

FIG. 3 depicts a table of syntax elements that are used for weighted prediction according to one embodiment.

DETAILED DESCRIPTION

Described herein are techniques for performing weighted prediction. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a variable, BitDepth, that may be set at a value based on a number of bits used to represent pixels in pictures of a video. The variable may be used in syntax elements in HEVC, such as the HEVC range extension, but other coding standards may be used. By using the variable, different resolutions for the video may be accommodated during the encoding and decoding process. For example, the number of pixels in the pictures may be represented by 8 bits, 10 bits, 12 bits, or another number of bits depending on the resolution. Using the BitDepth variable in the syntax provides flexibility in the motion estimation and motion compensation process. For example, syntax elements used in the weighted prediction process may take into account different numbers of bits used to represent the pictures.

Conventionally, a condition check is performed to determine if high-precision data is being processed; that is, if the number of pixels in pictures of the video are above a number or threshold, such as 8 bits. This condition check may be used to determine whether syntax elements should be within a range set by the BitDepth variable. When the high-precision data flag is not set, then the value of the weighted prediction syntax element is set by a fixed range that represents the standard number of pixels used to represent pixels in the pictures, such as 8 bits. Particular embodiments may remove the condition check. This simplifies the semantics used in the encoding and decoding process. In this case, even if the high-precision data flag is not set, the value of the weighted prediction syntax element is set by the BitDepth variable. However, even if the BitDepth is not considered high-precision data, such as 8 bits, the range for the weighted prediction syntax element is still the same as the fixed value. For example, the syntax elements luma_offset_l0[i], luma_offset_l1[i], delta_chroma_offset_l0[i][j], and delta_chroma_offset_l1[i][j] use the variable BitDepth as described above whether the flag extended_precision_processing_flag is enabled and not enabled to indicate whether the bit depth is above a threshold.

Figure 1:
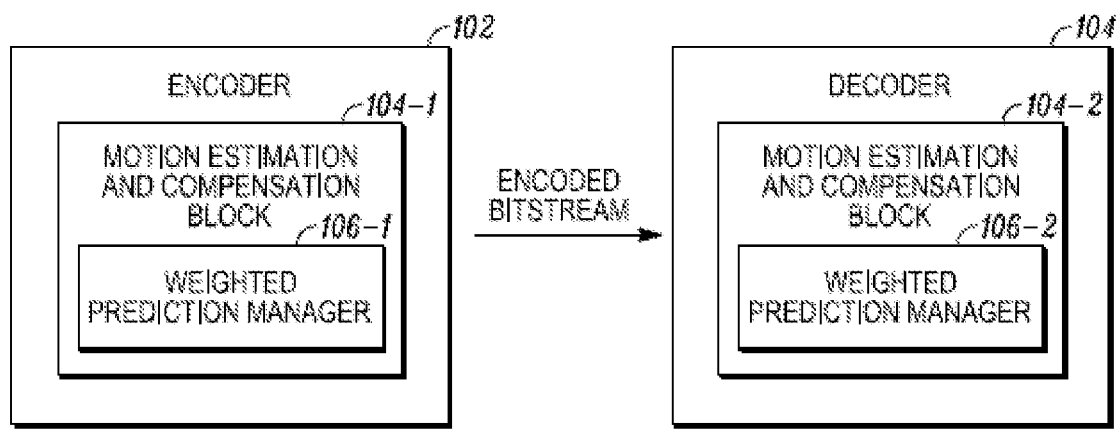
FIG. 1 depicts a simplified system for encoding and decoding video according to one embodiment.

FIG. 1 depicts a simplified system 100 for encoding and decoding video according to one embodiment. System 100 includes an encoder 102 and a decoder 104. Encoder 102 and decoder 104 may use a video coding standard to encode and decode video, such as HEVC. Specifically, encoder 102 and decoder 104 may use syntax elements from the HEVC range extension. Also, other elements of encoder 102 and decoder 104 may be appreciated.

Encoder 102 and decoder 104 perform temporal prediction through motion estimation and motion compensation. Motion estimation is a process of determining a motion vector (MV) for a current unit of video. For example, the motion estimation process searches for a best match prediction for a current unit of video (e.g., a prediction unit (PU)) over reference pictures. The best match prediction is described by the motion vector and associated reference picture ID. Also, a reference unit in a B picture may have up to two motion vectors that point to a previous reference unit in a previous picture and a subsequent reference unit in a subsequent reference picture in the picture order. Motion compensation is then performed by subtracting a reference unit pointed to by the motion vector from the current unit of video to determine a residual error that can be encoded. In the case of bi-prediction, the two motion vectors point to two reference units, which can be combined to form a combined bi-directional reference unit. The combined bi-directional reference unit can be subtracted from the current unit to determine the residual error.

To perform motion estimation and compensation, encoder 102 and decoder 104 include motion estimation and compensation blocks 104-1 and 104-2, respectively. In motion compensation, B and P pictures may exploit the temporal redundancy by using weighted prediction. Weighted prediction applies weighting factors to one or both of the reference pictures. In P pictures, the reference unit may be weighted before being used as a prediction for the current unit. In B pictures, the reference units are weighted before combining the reference pictures into the combined bi-directional reference unit. Conventionally, an average of the reference units from which the B picture is predicted may be used. However, using weighted prediction, a weighted average (or other weighted calculation) of the reference units may be used to predict the current unit. That is, the pixels of reference units may be weighted by weighting factors before combining. The following may be discussed with respect to B pictures, but the discussion will also apply to P pictures except that the combined bi-directional reference unit is replaced by one weighted reference unit. The use of weighted prediction may be useful when certain conditions happen in the video, such as when one scene fades into another or where there is a gradual variation in luminance, such as when fading to or from black or in cross-fades. For example, when fading occurs, the picture associated with the fading may not be as accurate to use as a prediction than a picture that does not include the fading. Weighting the picture that does not include the fading higher may create a better prediction for the current unit. That is, the pixels of the reference unit that does not include the fading effect may have a higher correlation to the current unit. The weighting may reduce the residual error and also reduce the bitrate.

The weighting factors may be provided for the luma and/or chroma components of reference units. Also, the weighting factors may be different based on the reference list used. That is, the bi-prediction may select a reference picture from a list0 and a list1. Reference pictures in list0 may be weighted with a weighting factor $w_0$ and reference pictures in list1 may be weighted with a weighting factor $w_1$. Also, only one of the reference pictures may be weighted. The weighting factors may be information that adjusts the pixel values differently in the reference units. In one embodiment, the weighting factors may be percentages.

The weighted prediction process may use syntax elements that define parameters that encoder 102 and decoder 104 use to perform the weighted prediction. By setting the values of these parameters, a weighted prediction manager 106-1 in encoder 102 and a weighted prediction manager 106-2 in decoder 104 can perform the weighted prediction process. In a simple example, the weighting factors may weight pixels in different reference pictures differently. Then, weighted prediction managers 106-1 and 106-2 take the weighted average of the reference units to use as a combined bi-directional reference unit. Motion estimation and compensation blocks 104-1 and 104-2 then use this combined bi-directional reference unit in the motion compensation process for the current unit. The syntax elements will be described in more detail below after describing the weighted prediction process in more detail.

Figure 2:
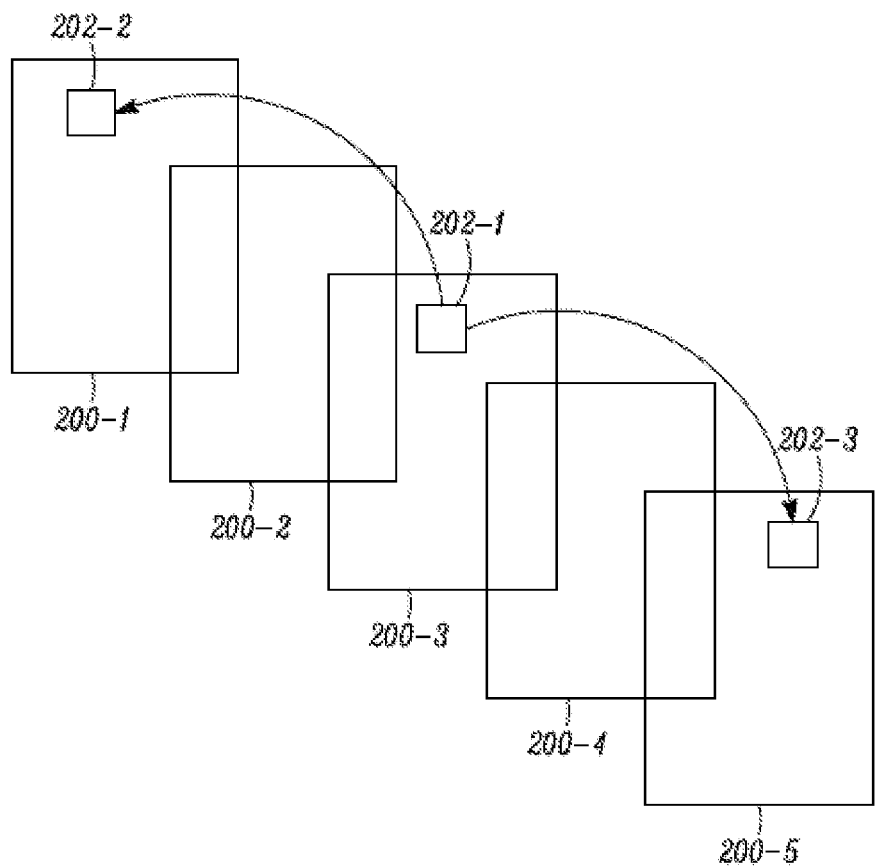
FIG. 2 depicts an example of the motion estimation and compensation process according to one embodiment.

FIG. 2 depicts an example of the motion estimation and compensation process according to one embodiment. The video includes a number of pictures 200-1-200-5. A current picture is shown at 200-3 and includes a current unit of video 202-1. Current unit 202-1 may be bi-predicted using reference units from reference pictures in other pictures 200, such as a previous picture 200-1 in the picture order and a subsequent picture 200-5 in the picture order. Picture 200-1 includes a reference unit 202-2 and picture 200-5 includes a reference unit 202-3, both of which can be used to predict current unit 202-1.

In weighted prediction, the pixels of reference units 202-2 and 202-3 may be weighted differently. For example, the pixels of reference units may be weighted by the weighting factors. In a simple example, the weighting factors may be percentages, such as the pixels of reference unit 202-2 may be weighted with a weighting factor $w_0$ of 0.25 and the pixels of reference unit 202-3 may be weighted with a weighting factor $w_1$ of 0.75. These weighting factors may then be used to calculate the pixel values used as the combined bi-directional reference unit for current unit 202-1.

Once the reference units are determined, motion estimation and compensation block 104-1 can determine motion vectors that represent the location of reference units 202-2 and 202-3 with respect to current unit 202-1. Then, motion estimation and compensation block 104-1 calculates a difference between the combined bi-directional reference unit and the current unit 202-1 as a residual error.

Once determining the residual error, encoder 102 encodes the residual error, the motion vectors, and also the weighting factors used to determine the combined bi-directional reference unit. Encoder 102 includes the encoded residual error, the motion vectors, and the weighting factors in an encoded bitstream that is sent to decoder 104. The term weighting factors is used for discussion purposes to represent information that is encoded that allows the weighted prediction process to be performed and the weighting factors to be determined. The syntax elements used to determine which information for the weighting factors that are encoded in the encoded bitstream are described in more detail below.

Decoder 104 receives the encoded bitstream and can reconstruct the pictures of the video. Decoder 104 may reconstruct reference units 202-2 and 202-3 from the encoded bitstream prior to decoding current unit 202-1. Also, decoder 104 decodes the residual error for current unit 202-1, the motion vectors for current unit 202-1, and the weighting factors. Then, in decoder 104, motion estimation and compensation block 104-2 may then use the residual error to reconstruct the current unit 202-1. For example, motion estimation and compensation block 104-2 may use the motion vectors to locate reconstructed reference units 202-2 and 202-3. Then, weighted prediction manager 106-2 applies the weighting factors to the reconstructed units 202-2 and 202-3 to form the reconstructed combined bi-directional reference unit. The reconstructed residual error is then added to the reconstructed combined bi-directional predicted unit to form a reconstructed current unit.

As mentioned above, syntax elements for weighted prediction may use a variable BitDepth in the weighted prediction process. The variable BitDepth may represent a number of bits used to represent a pixel in a picture. The following will describe syntax elements that use the bit depth variable.

FIG. 3 depicts a table 300 of syntax elements that are used for weighted prediction according to one embodiment. There are syntax elements for the luma and chroma components of the video, and also for list0 and list1. The combined bi-directional reference unit may be determined by applying the weighting factors in an averaging operation. In an example to illustrate the calculation, the weighting factor $w_0$ is multiplied by the previous reference unit 202-2 (e.g., the luma and chroma components of the pixels) and the weighting factor $w_1$ is multiplied by the subsequent reference unit 202-3 (e.g., the luma and chroma components of the pixels). Then, the two values are added together and divided by the added weighting factors (e.g., normalization). The above example may not be exactly how encoder 102 and decoder 104 perform the calculation to determine the combined bi-directional reference unit. Various methods may be used, but performing a division operation may be an expensive computational operation. One method of deriving the weighting factors is to use bit shifting. The weighting factors can be derived with a common denominator and the division is represented by a right shift of the combined weighted prediction of a number of bits based on a base 2 logarithm of the denominator. That is, the weighting factor, such as the luma weighting factor, may be bit shifted by the base 2 logarithm of the denominator.

The following syntax elements encode parameter values that can be used to perform the weighted prediction process. The syntax elements in Table 300 of luma_offset_l0[i] at 302 and delta_chroma_offset_l0[i][j] at 304 may use a BitDepth variable for the number of bits that represent a pixel in the pictures. These syntax elements are for list0. Corresponding variables for list1 are also provided for luma_offset_l1[i] at 306 and delta_chroma_offset_l1[i][j] at 308. The list0 elements may be described in detail, but any discussion with respect to list0 elements also applies to list1 elements. Using the BitDepth variable with these syntax elements allows these syntax elements to be used for video that may represent pixels with a different number of bits, such as 8, 10, 12, 14, 16, etc., bits. The syntax elements can thus handle high precision data, which may be when pixels are represented by more than 8 bits. Further, as will be described below, using the BitDepth variable allows a condition check to be avoided in encoder 102 and decoder 104. Other syntax elements in Table 300 will also be described below to provide reference with respect to the above syntax elements.

The syntax element luma_log 2_weight_denom is the base 2 logarithm of the denominator for all luma weighting factors. The value of luma_log 2_weight_denom shall be in the range of 0 to 7, inclusive, or 0 to $BitDepth_Y$, inclusive, where $BitDepth_Y$ is the bit depth of the luma component of the reference picture. By including the range to be dependent on the variable $BitDepth_Y$, the value can represent different numbers of bits for the pixels. The syntax element luma_log 2_weight_denom is used to calculate the luma weighting factor (e.g., the delta luma weighting factor of the syntax element delta_luma_weight_l0[i] and delta_luma_weight_l1[i] described below).

The syntax element delta_chroma_log 2_weight_denom is the difference of the base 2 logarithm of the denominator for all chroma weighting factors. The variable Chroma Log 2WeightDenom, which is the log 2 denominator of the chroma weighting factor, is derived to be equal to luma_log 2_weight_denom+delta_chroma_log 2_weight_denom, and the value shall be in the range of 0 to 7, inclusive, or 0 to $BitDepth_C$, inclusive, where the variable $BitDepth_C$ is the bit depth of the chroma component of the reference picture. By including the range to be dependent on the variable $BitDepth_C$, the chroma weighting factor value can represent different numbers of bits for the pixels.

The syntax element luma_weight_l0_flag[i], when equal to 1, specifies that weighting factors for the luma component of list 0 prediction using RefPicList0[i] are present. The syntax element luma_weight_l0_flag[i], when equal to 0, specifies that these weighting factors are not present.

The syntax element chroma_weight_l0_flag[i], when equal to 1, specifies that weighting factors for the chroma prediction values of list 0 prediction using RefPicList0[i] are present. The syntax element chroma_weight_l0_flag[i], when equal to 0, specifies that the chroma weighting factors are not present. When chroma_weight_l0_flag[i] is not present, it is inferred to be equal to 0.

The syntax element delta_luma_weight_l0[i] is the difference of the weighting factor applied to the luma prediction value for list 0 prediction using RefPicList0[i]. The variable LumaWeightL0[i] may be the luma weighting factor for list0 and is derived to be equal to (1<<luma_log 2_weight_denom)+delta_luma_weight_l0[i]. That is, the luma weighting factor is a right shift of the variable luma_log 2_weight_denom plus the value of delta_luma_weight_l0[i]. When luma_weight_l0_flag[i] is equal to 1, the value of delta_luma_weight_l0[i] shall be in the range of −128 to 127, inclusive, or −(1<<($BitDepth_Y$−1)), (1<<($BitDepth_Y$−1))−1, inclusive, where $BitDepth_Y$ is the bit depth for the luma component of the reference picture. This sets the range of the weighting factor to be based on the variable $BitDepth_Y$. When luma_weight_l0_flag[i] is equal to 0, LumaWeightL0[i] is inferred to be equal to $2^{luma\_log\ 2\_weight\_denom}$.

The syntax element delta_chroma_weight_l0[i][j] is the difference of the weighting factor applied to the chroma prediction values for list 0 prediction using RefPicList0[i] with j equal to 0 for Cb and j equal to 1 for Cr. The variable ChromaWeightL0[i][j] may be the chroma weighting factor for list0 and is derived to be equal to (1<<Chroma Log 2WeightDenom)+delta_chroma_weight_l0[i][j]. That is, the chroma weighting factor is a right shift of the variable Chroma Log 2WeightDenom plus the value of delta_chroma_weight_l0[i][j]. When chroma_weight_l0_flag[i] is equal to 1, the value of delta_chroma_weight_l0[i][j] shall be in the range of −128 to 127, inclusive, or −(1<<(BitDepth$_C$−1)), (1<<(BitDepth$_C$−1))−1, inclusive, where BitDepth$_C$ is the bit depth for the chroma component of the reference picture. This sets the range of the weighting factor to be based on the variable BitDepth$_C$. When chroma_weight_l0_flag[i] is equal to 0, ChromaWeightL0[i][j] is inferred to be equal to $2^{Chroma\ Log\ 2WeightDenom}$.

As mentioned above, the syntax elements luma_offset_l0[i] and delta_chroma_offset_l0[i][j] may use the BitDepth variable whether an extended precision flag is enabled and not enabled to indicate whether the bit depth is above a threshold, which alleviates the need to perform a condition check to determine if high precision data is being used. In the syntax, a control flag extended_precision_processing_flag may be used to indicate when the bit depth of pixels of a picture is above a threshold or number, such as 8 bits. Conventionally, for the syntax elements luma_offset_l0[i] and delta_chroma_offset_l0[i][j], the semantics used a condition check of the flag extended_precision_processing_flag to determine when the range should be fixed or be based on the BitDepth variable.

The syntax element luma_offset_l0[i] is the additive offset applied to the luma prediction value for list 0 prediction using RefPicList0[i]. This offset value will be added to a base prediction value to determine the real weighted prediction value. [Conventionally, for the syntax element luma_offset_l0[i], encoder 102 and decoder 104 need to perform a condition check to determine if the flag extended_precision_processing_flag is equal to 0. When equal to 0, this means that the number of bits in the pictures of the video is equal to a base value, such as 8 bits (e.g., high precision data is not being processed). In this case, the range of the syntax element luma_offset_l0[i] is within the range of −128 to 127, inclusive. This is the range when the number of bits to represent the pixels is 8 bits. If the flag extended_precision_processing_flag is equal to 1, then the value of the syntax element luma_offset_l0[i] is within a range set by the BitDepth variable as described above. For example, the following semantics are conventionally used:

If extended_precision_processing_flag equal to 0, the value of luma_offset_l0[i] shall be in the range of −128 to 127, inclusive. If extended_precision_processing_flag equal to 1, the value of luma_offset_l0[i] shall be in the range of −(1<<(BitDepth$_Y$−1) to (1<<(BitDepth$_Y$−1)−1, inclusive. When luma_weight_l0_flag[i] is equal to 0, luma_offset_l0[i] is inferred as equal to 0.

The syntax element delta_chroma_offset_l0[i][j] is the difference of the additive offset applied to the chroma prediction values for list 0 prediction using RefPicList0[i] with j equal to 0 for Cb and j equal to 1 for Cr. This is the delta value for the chroma prediction values used for the motion compensation process. This element is used to calculate the additive offset value for chroma prediction. Conventionally, for the syntax element delta_chroma_offset_l0[i][j], encoder 102 and decoder 104 need to perform a condition check to determine if the flag extended_precision_processing_flag is equal to 0. When equal to 0, this means that the number of bits in the pictures of the video is equal to a base value, such as 8 bits. When equal to 0, encoder 102 or decoder 104 then determines the value for a variable ChromaOffsetL0[i][j] to be equal to:

ChromaOffset$L0[i][j]$=Clip3(−128, 127, (delta_chroma_offset_$l0[i][j]$−((128*ChromaWeight$L0[i][j]$) >>Chroma Log 2WeightDenom)+128))

As can be seen, the variable ChromaOffsetL0[i][j] includes the values "−128, 127", which represents the range of −128 to 127, inclusive. This means the value of delta_chroma_offset_l0[i][j] shall be in the range of −512 to 511, inclusive, which is when the bit depth is 8 bits. When chroma_weight_l0_flag[i] is equal to 0, ChromaOffsetL0[i][j] is inferred to be equal to 0.

If the flag extended_precision_processing_flag is equal to 1, then the value of a variable ChromaOffsetL0[i][j] is equal to:

If extended_precision_processing_flag equal to 1,

ChromaOffset$L0[i][j]$=Clip3(−(1<<(BitDepth$_C$−1), (1<<(BitDepth$_C$−1)−1, (delta_chroma_offset_$l0$ $[i][j]$−(((1<<(BitDepth$_C$−1))*ChromaWeight$L0$ $[i][j]$)>>Chroma Log 2WeightDenom)+(1<< (BitDepth$_C$−1)))

As can be seen in this equation when the flag extended_precision_processing_flag is equal to 1, the values "−128, 127" are exchanged with a range based on the BitDepth variable of "−(1<<(BitDepth$_C$−1), (1<<(BitDepth$_C$−1)−1". In this case, the variable ChromaOffsetL0[i][j] is further based on the BitDepth variable for the chroma component of the video. This represents that the value of the syntax element delta_chroma_offset_l0[i][j] shall be in the range of −(1<<(BitDepth$_C$+1) to (1<<(BitDepth$_C$+1)−1, inclusive. When the flag extended_precision_processing_flag was equal to 0, the value of delta_chroma_offset_l0[i][j] was in a fixed range of −512 to 511, inclusive. Thus, a fixed range was used above when the flag extended_precision_processing_flag is equal to 0.

Particular embodiments may remove the condition check in the semantics such that the value of syntax elements luma_offset_l0[i] and delta_chroma_offset_l0[i][j] are always dependent upon the BitDepth variable whether the flag extended_precision_processing_flag is enabled and not enabled to indicate whether the bit depth is above a threshold. This removes the condition check and simplifies the semantics. However, even if the flag extended_precision_processing_flag is equal to 0 indicating that high-precision data is not being processed, the values for the syntax elements luma_offset_l0[i] and delta_chroma_offset_l0[i][j] still are dependent upon the BitDepth variable. The calculation to determine the values of the syntax element luma_offset_l0[i] even when high precision data is not being processed may be less computationally intensive than performing a condition check.

The following illustrates the syntax elements luma_offset_l0[i] and delta_chroma_offset_l0[i][j] with definitions that allow for the removal of the condition check.

The syntax element luma_offset_l0[i] is the additive offset applied to the luma prediction value for list0 prediction using RefPicList0[i]. The value of luma_offset_l0[i] shall be in the range of −(1<<(BitDepth$_Y$−1) to (1<<(BitDepth$_Y$−1)−1, inclusive. When luma_weight_l0_flag[i] is equal to 0, luma_offset_l0[i] is inferred as equal to 0. For the syntax element luma_offset_l0[i], the fixed range of −128 to 127 is removed and replaced with −(1<<(BitDepth$_Y$−1) to (1<<(BitDepth$_Y$−1)−1, inclusive. This makes the value of the syntax element luma_offset_l0[i] based on the BitDepth value whether or not the flag extended_precision_processing_flag is 0 or 1 (e.g., enabled or disabled).

The syntax element delta_chroma_offset_l0[i][j] is the difference of the additive offset applied to the chroma prediction values for list0 prediction using RefPicList0[i] with j equal to 0 for Cb and j equal to 1 for Cr. For the syntax element delta_chroma_offset_l0[i][j], the variable ChromaOffsetL0[i][j] may always be based off of the BitDepth variable whether or not the flag extended_precision_processing_flag is 0 or 1. That is, the range "−128 to 127" is replaced by −(1<<(BitDepth$_C$−1), (1<<(BitDepth$_C$−1)−1. For example, the following is used to calculate the variable ChromaOffsetL0[i][j]

ChromaOffsetL0[i][j]=Clip3(−(1<<(BitDepth$_C$−1),
(1<<(BitDepth$_C$−1)−1, (delta_chroma_offset_l0
[i][j]−(((1<<(BitDepth$_C$−1))*ChromaWeightL0
[i][j])>>Chroma Log 2WeightDenom)+(1<<
(BitDepth$_C$−1))).

The value of delta_chroma_offset_l0[i][j] shall be in the range of −(1<<(BitDepth$_C$+1) to (1<<(BitDepth$_C$+1)−1, inclusive. When chroma_weight_l0_flag[i] is equal to 0, ChromaOffsetL0[i][j] is inferred to be equal to 0.

This means that the value of the syntax element delta_chroma_offset_l0[i][j] shall always be within the range set by −(1<<(BitDepth$_C$+1) to (1<<(BitDepth$_C$+1)−1, inclusive, whether or not the flag extended_precision_processing_flag is 0 or 1. Also, the calculation to determine the values of the syntax element and delta_chroma_offset_l0[i][j] even when high precision data is not being processed may be less computationally intensive than performing a condition check.

The syntax elements luma_weight_l1_flag[i], chroma_weight_l1_flag[i], delta_luma_weight_l1[i], luma_offset_l1[i], delta_chroma_weight_l1[i][j], and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j], and delta_chroma_offset_l0[i][j], respectively, with l0, L0, list 0, and List0 replaced by l1, L1, list 1, and List1, respectively. The variable sumWeightL0Flags is derived to be equal to the sum of luma_weight_l0_flag[i]+2*chroma_weight_l0_flag[i], for i=0 . . . num_ref_idx_l0_active_minus1. When slice_type is equal to B, the variable sumWeightL1Flags is derived to be equal to the sum of luma_weight_l1_flag[i]+2*chroma_weight_l1_flag[i], for i=0 . . . num_ref_idx_l1_active_minus1. It is a requirement of bitstream conformance that, when slice_type is equal to P, sumWeightL0Flags shall be less than or equal to 24, and when slice_type is equal to B, the sum of sumWeightL0Flags and sumWeightL1Flags shall be less than or equal to 24.

Accordingly, by using the variable BitDepth for the luma and chroma components, encoder 102 may change the number of bits that is used for weighted prediction based on the number of bits that represent pixels in the pictures of the video. In one embodiment, encoder 102 knows the BitDepth for the pictures of a video and can set the variable BitDepth to the value of the number of bits that represent the pixels of pictures. The semantics are also simplified by removing a condition check.

Figure 4:
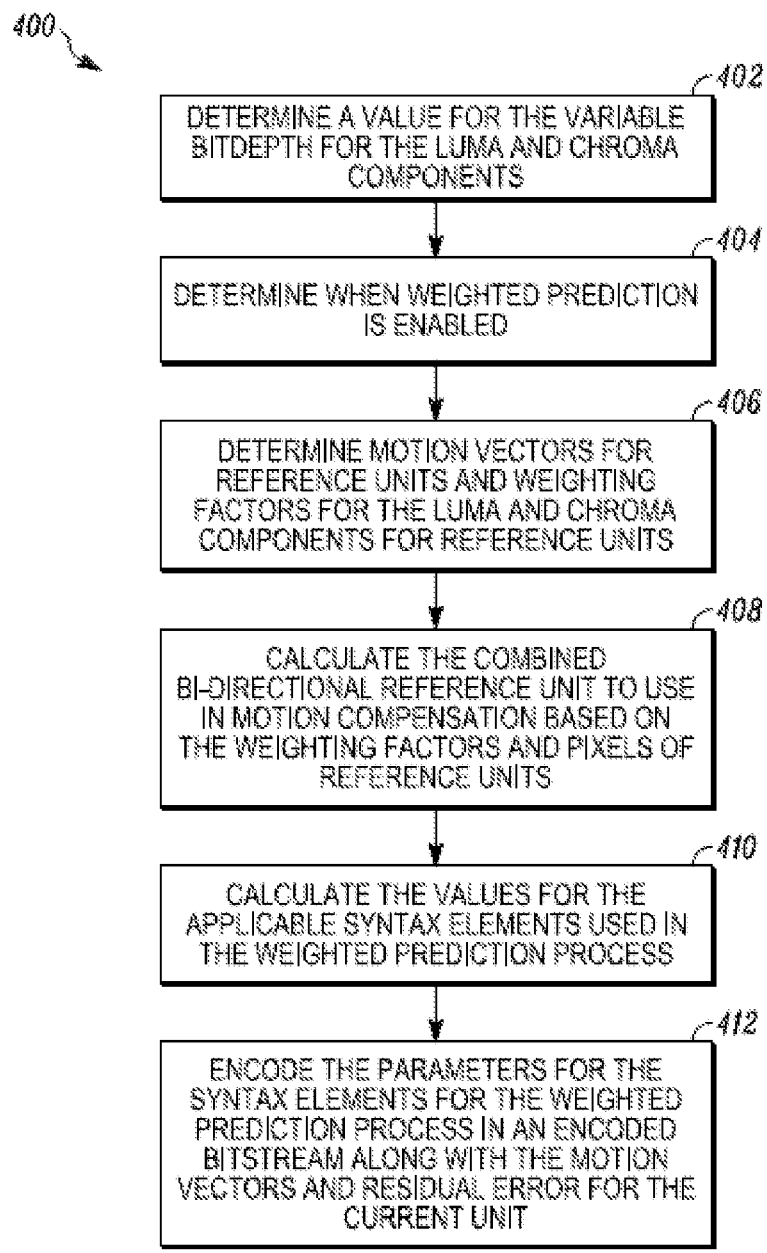
FIG. 4 depicts a simplified flowchart of a method for using the variable BitDepth in the encoding process according to one embodiment.

FIG. 4 depicts a simplified flowchart 400 of a method for using the variable BitDepth in the encoding process according to one embodiment. At 402, encoder 102 determines a value for the variable BitDepth for the luma and chroma components. The value may be based on the precision of the video, such as a number of bits that represent the pixels in pictures of a video. Encoder 102 may determine the value based on analyzing characteristics of the video. Also, the number of bits that represent the pixels may be input or included in metadata associated with the video.

At 404, motion estimation and compensation block 104-1 determines when weighted prediction is enabled. For example, weighted prediction flags, luma_weight_l0_flag[i] and chroma_weight_l0_flag[i], may be set to indicate that weighted prediction is enabled for the luma and chroma components.

At 406, weighted prediction manager 106-1 determines motion vectors for reference units 202-2 and 202-3 and weighting factors for the luma and chroma components for reference units 202-2 and 202-3 (e.g., list0 and list1). The weighting factors may be assigned to the pictures (e.g., list0 and list1) that are being used as reference pictures for a current picture.

At 408, weighted prediction manager 106-1 then calculates the combined bi-directional reference unit to use in motion compensation based on the weighting factors and pixels of reference units 202-2 and 202-3. As described above, the weighting factors weight pixels differently in reference units 202-2 and 202-3. At 410, motion estimation and compensation block 104-1 determines the residual error using current unit 202-1 and the combined bi-directional reference unit.

At 412, encoder 102 calculates the values for the applicable syntax elements used in the weighted prediction process. For example, the values for the syntax elements luma_offset_l0[i], luma_offset_l1[i], delta_chroma_offset_l0[i][i], and delta_chroma_offset_l1[i][j] using the variable BitDepth are calculated. This includes performing the calculation without a condition check for the flag extended_precision_processing_flag.

At 414, encoder 102 encodes the parameters for the syntax elements for the weighted prediction process in an encoded bitstream along with the motion vectors and residual error for current unit 202-1. For example, encoder 102 encodes the values calculated for the syntax elements shown in Table 300 in FIG. 3. At 416, encoder 102 sends the encoded bitstream to decoder 104.

Figure 5:
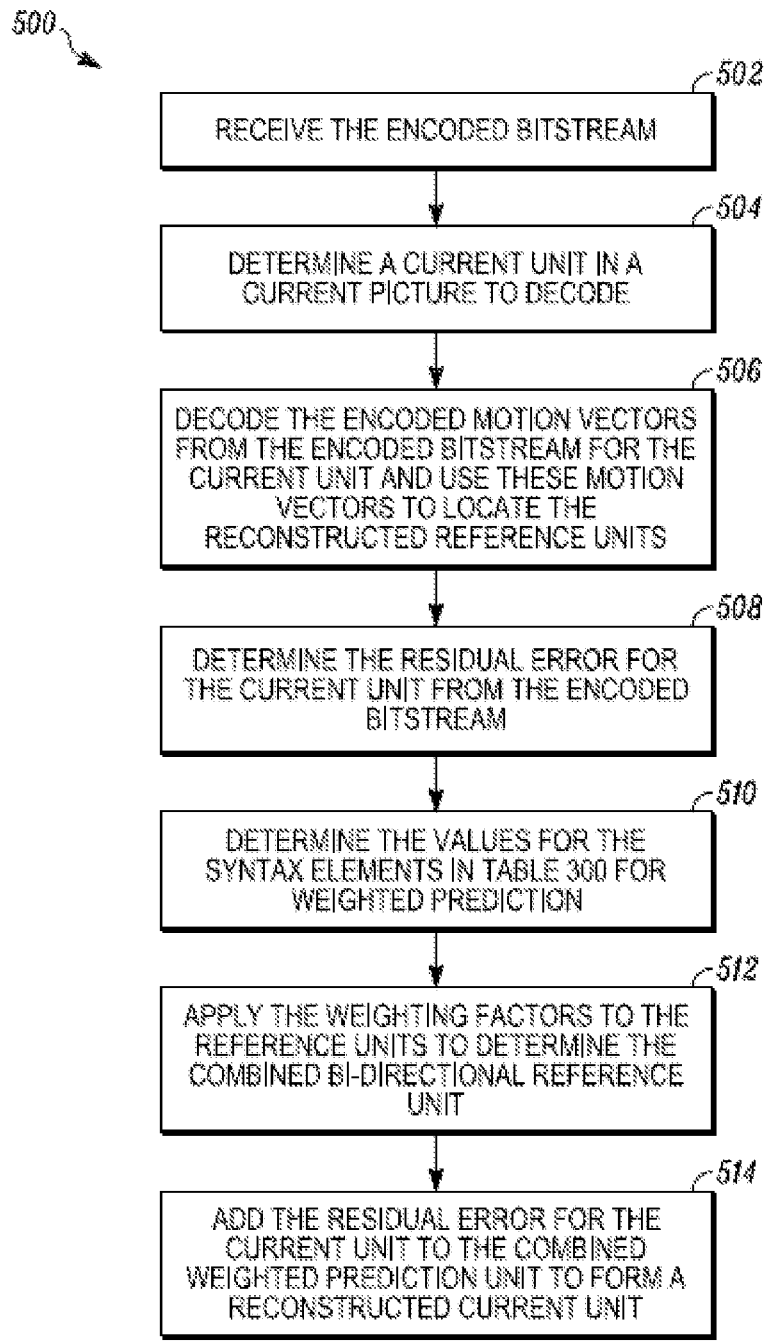
FIG. 5 depicts a simplified flowchart for decoding an encoded bitstream using the variable BitDepth according to one embodiment.

FIG. 5 depicts a simplified flowchart 500 for decoding an encoded bitstream using the variable BitDepth according to one embodiment. At 502, decoder 104 receives the encoded bitstream. At 504, decoder 104 then determines a current unit 202-1 in a current picture to decode. At 506, decoder 104 decodes the encoded motion vectors from the encoded bitstream for current unit 202-1 and uses these motion vectors to locate the reconstructed reference units 202-2 and 202-3. Also, at 508, decoder 104 determines the residual error for current unit 202-1 from the encoded bitstream.

At 510, weighted prediction manager 106-2 may determine the values for the syntax elements in Table 300 for weighted prediction. This may allow weighted prediction manager 106-2 to determine the weighting factors. For example, the values for the syntax elements luma_offset_l0 [i], luma_offset_l1[i], delta_chroma_offset_l0[i][j], and delta_chroma_offset_l1[i][j] using the variable BitDepth are calculated. This includes performing the calculation without a condition check for the flag extended_precision_processing_flag.

At 512, weighted prediction manager 106-2 may then apply the weighting factors to reference units 202-2 and 202-3 to determine the combined bi-directional reference unit. At 514, motion estimation and compensation block 104-2 can then add the residual error for current unit 202-1 to the combined weighted prediction unit to form a reconstructed current unit.

Accordingly, particular embodiments use a variable BitDepth for syntax elements in the weighted prediction process. For example, the syntax elements luma_offset_l0 [i], luma_offset_l1[i], delta_chroma_offset_l0 [i][j], and delta_chroma_offset_l1[i][j] use the variable BitDepth as described above whether the flag extended_precision_processing_flag is enabled and not enabled to indicate whether the bit depth is above a threshold.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   setting a first range for a variable associated with a bit depth representing a number of bits in pixels of a reference picture used in coding a video containing a current picture;
   determining a weighting factor for performing weighted prediction for a current unit of the current picture;
   using the weighting factor to weight pixels of a first reference unit of a first reference picture when performing motion compensation for the current unit; and
   setting a second value for a weighted prediction syntax element associated with the weighting factor, the second value being set using the first range irrespective of whether an extended precision flag is enabled or not enabled, the extended precision flag indicating whether the bit depth is above a threshold, wherein the second value for the weighted prediction syntax element is within a range set by the first range and is an offset for a prediction value used in performing motion compensation when coding the current picture of the video.

2. The method of claim 1, wherein a condition check of a status for the extended precision flag is not performed in conjunction with setting the second value.

3. The method of claim 1, wherein the weighted prediction syntax element is for applying the offset for a first component of the prediction value.

4. The method of claim 3, wherein the first component comprises a luma component of a video.

5. The method of claim 3, wherein the range comprises $-(1<<(BitDepth_Y-1))$ to $(1<<(BitDepth_Y-1))-1$, wherein $BitDepth_Y$ is a variable for a luma component.

6. The method of claim 1, wherein the weighted prediction syntax element is for applying a difference of the offset for a first component of the prediction value.

7. The method of claim 6, wherein the first component comprises a chroma component of a video.

8. The method of claim 6, the range comprises $-(1<<(BitDepth_C-1))$ to $(1<<(BitDepth_C-1))-1$, wherein $BitDepth_C$ is a variable for a chroma component.

9. The method of claim 8, wherein the offset for the first component is derived using:
   $Clip3(-(1<<(BitDepth_C-1)), (1<<(BitDepth_C-1))-1, (delta\_chroma\_offset\_l0[i][j]-(((1<<(BitDepth_C-1))*ChromaWeightL0[i][j])>>ChromaLog2WeightDenom)+(1<<(BitDepth_C-1))))$, where $BitDepth_C$ is the variable for the first component.

* * * * *